3,116,291
9-(PROPENE-3-YLIDENE-1), AND 9-[3'-(N-HYDROXYALKYLPIPERAZINO-N)-PROPYLIDENE], XANTHENES AND THIAXANTHENES, AND PROCESSES FOR THEIR PREPARATION

Povl Viggo Petersen, Niels O. Lassen, and Torkil O. Holm, Copenhagen, Denmark, assignors to Kefalas, A/S, Copenhagen-Valby, Denmark
No Drawing. Filed Dec. 1, 1959, Ser. No. 856,353
Claims priority, application Denmark Dec. 4, 1958
18 Claims. (Cl. 260—240)

The present invention relates to a method for the preparation of therapeutically valuable xanthenes and thiaxanthenes of the general formula:

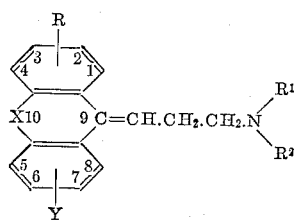

I wherein X represents oxygen or sulfur, R and Y may be the same or different and each represents hydrogen, halogen, lower-alkoxy or lower-alkylmercapto, and $R^1$ and $R^2$ each represents hydrogen or methyl, at least one of $R^1$ and $R^2$ representing methyl, or $R^1$ and $R^2$ together with the nitrogen atom represent a saturated five-membered or six-membered heterocyclic ring, such as pyrrolidine, piperidine, morpholine, thiamorpholine, piperazine, N'-lower-alkylpiperazine, N'-hydroxy-lower-alkylpiperazine, or N'-lower-aliphatic acyloxy lower-alkylpiperazine, and acid addition salts theerof. The invention is, moreover further concerned with certain novel 9-[3'-(N'-hydroxy- and acyloxyalkylpiperazino - N) - propylidene]-xanthenes and thiaxanthenes which possess valuable therapeutic properties of the chlorpromazine type. The invention is, in addition, concerned with certain valuable intermediate 9-allyl-xanthenol-(9), 9-allylthiaxanthenol-(9), and 9-(propene-3-ylidene-1)-xanthene and thiaxanthene compounds which are produced in or which may be used as intermediates in the process of the present invention.

The method of the present invention distinguishes itself in that, in accord therewith, starting from inexpensive and readily available raw materials, xanthenes and thiaxanthenes of Formula I are obtained in a satisfactory state of purity and in economically satisfactory yields, and in that it has a broad range of application in the production of such compounds having a wide variety of

substituents.

It is accordingly an object of the invention to provide a novel amine addition process and certain novel products which may be produced therein and thereby. Other objects of the invention will become apparent hereinafter.

Various of the compounds within the scope of Formula I are hitherto unknown. When they are asymmetrically substituted in the xanthene or thiaxanthene ring system, the compounds of Formula I may exist in both cis and trans forms, which forms have been isolated in numerous cases. The compounds of Formula I, and especially the novel compounds of the invention, possess valuable pharmacodynamic properties. They exert a pronounced depressant action on the central nervous system and have a strong antiemetic effect. In animal experiments, they show a strong sedative effect and are capable of depressing motor activity to a pronounced degree without producing a simultaneous hypnotic effect. They further potentiate and prolong the action of barbiturates and analgesics and have a hypothermic effect. In addition, they exhibit a blood pressure depressing and spasmolytic effect and show a distinct antiepinephrine effect. The compounds of Formula I also show effects similar to those of chlorpromazine in clinical use.

In animal experiments, the pharmacodynamic effects produced by compounds of the present invention have proved to be considerably stronger than those produced by chlorpromazine. Thus it may be mentioned that, in experiments in mice, 9-[3'-(N'-hydroxyalkylpiperazino-N)-propylidene]-xanthenes and thiaxanthenes as represented, for example, by 2-chloro-9-[3'-(N'-2-hydroxyethylpiperazino-N)-propylidene]-thiaxanthene, e.g. in the form of its dihydrochloride, show a superior therapeutic index and a more pronounced ability to reduce motor activity than does chlorpromazine.

In the foregoing formula, the term lower-alkyl refers to an alkyl radical containing up to and including eight carbon atoms, which may have either straight or branched chain structure, for example, methyl, ethyl, propyl, isopropyl, butyl, isobutyl, amyl, hexyl, heptyl, octyl, or the like; lower-alkoxy refers to a radical of the formula A—O—, wherein A is lower-alkyl; and lower-alkylmercapto refers to a radical of the formula A—S—, wherein A is lower-alkyl. The N'-hydroxy-lower-alkylpiperazine and N'-lower-aliphatic acyloxy-lower-alkylpiperazine radicals may be represented by the partial formula:

N-lower-alkylene-OZ wherein the lower-alkylene radical is straight or branched and is a lower-alkyl radical minus one hydrogen atom, while Z is hydrogen or lower-aliphatic acyl, for example, acetyl, propionyl, isopropionyl, valeryl, caproyl, heptanoyl, octanoyl, and the like, the lower-aliphatic acyl radical being straight or branched and containing up to nine carbon atoms, inclusive.

According to the method of the invention, xanthenes and thiaxanthenes of Formula I or acid addition salts thereof are prepared by treating xanthenes or thiaxanthenes which are hydroxy-substituted in the nine-position and have the general formula:

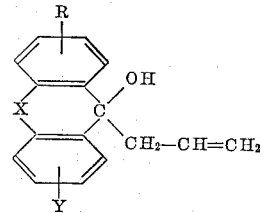

II wherein X, R, and Y are as given above, with a dehydrating agent according to known procedure, whereafter the reaction product of the formula:

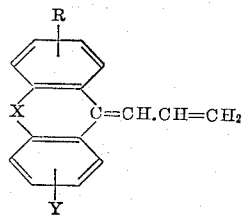

III is reacted with an amine of the formula

wherein R¹ and R² are as given above, whereupon the resulting xanthene or thiaxanthene of the Formula I is isolated from the reaction mixture as the free base or in the form of an acid addiiton salt thereof. In the event said base or acid addition salt is a mixture of isomers, the individual isomers thereof are isolated, if desired, by procedure already known for the separation and isolation of such isomers.

According to a preferred modification of the method of the invention, compounds of Formula I having an N'-substituted piperazino ring are prepared by reacting, according to the invention, a compound of Formula III with piperazine, whereafter the desired substituent is introduced at the secondary nitrogen atom by treatment according to known alkylation procedure with an alkylating agent such as methanolic formaldehyde in formic acid according to the classic Eschweiler-Clarke procedure, or such as a reactive alkyl or substituted alkyl ester, especially a hydroxyalkyl or acyloxyalkyl ester, for example, alkyl or substituted alkyl halides, e.g., bromides or iodides, alkyl or substituted alkyl sulfates or sulfonates of the sodium or potassium alkyl sulfate or sulfonate type or of the dialkyl sulfate type, and the like, or by interaction with a lower-alkylene oxide such as ethylene, propylene, or butylene oxide according to conventional procedure for such alkylene oxide addition. Suitable alkylating agents may, for example, have the formula Q-lower-alkyl and Q-lower-alkylene-OH, wherein the lower-alkyl or lower-alkylene radical contains up to and including eight carbon atoms, and Q is the remainder of the reactive ester, such as a halogen atom or a sulfonic or sulfuric acid radical.

The xanthenes and thiaxanthenes of Formula II, which are hydroxy-substituted in the nine-position, may be conveniently used as starting materials in the present process, and are hitherto unknown compounds. They are conveniently prepared by reacting the corresponding xanthones or thiaxanthones with an allyl magnesium halogenide in ether, whereafter the resulting magnesium complex is hydrolyzed, according to conventional procedure for such type reactions.

The reaction products of Formula III, formed from the said starting materials of Formula II by dehydration, are likewise hitherto unknown compounds.

In practicing the invention, the dehydration step is advantageously effected by treating a xanthene or a thiaxanthene of Formula II, which is hydroxy-substituted in the nine-position, with an acid, including the use of a compound which is capable of forming an acid in situ in the reaction mixture in question. It is advantageous to use a strong acid such as a hydrogen halide or sulfuric acid, or a compound which is capable of forming a strong acid in the reaction mixture, the dehydration thereby proceeding especially readily and smoothly. As an example of such latter type compounds may be mentioned inorganic acid halides such as thionyl chloride, sulfuryl chloride, and phosphoric acid halides, such as phosphorus oxychloride and phosphorus trichloride, organic acid halides such as acetyl chloride and benzoyl chloride, and acid anhydrides such as sulfur trioxide, and the like.

In addition, weaker acids or compounds which are capable of forming weaker acids in the reaction mixture in question may sometimes be used to effect the dehydration. As examples may be mentioned phosphoric acids, trichloroacetic acid, dichloroacetic acid, monochloroacetic acid, oxalic acid, succinic acid, citric acid, boric acid, boric acid triacetate, and the like.

The said dehydration may in many cases be effected even with very small amounts of the said acids, or acid-forming compounds and, according to a specially convenient modification of the method of the invention, such an acid or compound is used in the dehydration step in an amount substantially smaller than that equivalent to the hydroxy-substituted xanthene or thiaxanthene. In this manner, the formation of such byproducts which might otherwise be formed is limited, particularly at higher temperatures, e.g., polymerization of the reaction product of Formula III resulting from the dehydration is avoided or limited and addition of a hydrogen halide (used to effect the dehydration) to a double bond of the aliphatic carbon chain in the nine-position is minimized. Such an addition may, for example, take place to a certain extent when the hydrogen halide is used in greater concentrations.

Further, it has been found that the dehydration proceeds especially readily and smoothly when carried out, according to the invention, in the presence of an agent capable of binding the water liberated by the reaction, such as acetic acid anhydride or the like.

Likewise, it is sometimes advantageous to undertake the dehydration step in the presence of a solvent. Examples of suitable solvents are hydrocarbons, especially aromatic hydrocarbons such as benzene, toluene, or xylene, halogenated hydrocarbons such as chloroform, alkanols such as methanol and ethanol, ethers, acetic acid, and the like.

The dehydration in many cases proceeds smoothly even at room temperature and, especially in cases where the dehydration is effected by a strong acid or a compound capable of forming such strong acid in the reaction mixture in question, in an amount approximately equivalent to the amount of hydroxy-substituted xanthene or thiaxanthene or in excess, it may even be convenient to carry out the dehydration while cooling in order to limit the formation of byproducts.

In order to secure a reasonable time of reaction, it may be convenient in other cases to omit cooling of the reaction mixture or even to undertake the dehydration at increased temperature, e.g., in the vicinity of the boiling point of a solvent chosen for the dehydration step, e.g., up to about 120 degrees centigrade. It is, however, an essential technical advantage of the method of the invention that no substantial amounts of byproducts are or need be formed even at such increased temperatures when the dehydration is effected using an acid or a compound capable of forming an acid in the reaction mixture in question, it being only necessary that said acid or compound be used in the case of the employment of higher temperatures in an amount substantially less than that equivalent to the hydroxy-substituted xanthene or thiaxanthene.

As has been mentioned, the xanthenols and thiaxanthenols of Formula II may be caused to split off water by reaction with acids or compounds which can form acids in amounts substantially smaller than those equivalent to the xanthenol or thiaxanthenol, i.e., even in catalytic amounts, and it may be assumed that, in this modification of the method of the invention, hydrogen ions catalytically promote the dehydration.

However, in accord with the invention, an acid halogenide such as thionyl chloride may also be used as a dehydrating agent in an amount up to that equivalent to the xanthenol or thiaxanthenol in question, especially in the pressure of a tertiary amine such as pyridine, triethylamine, or the like. Of course, because of the basic milieu, a hydrogen ion catalysis is out of question in this case.

As compounds of the Formula III sometimes tend to polymerize, it is often advantageous not to isolate these compounds, but rather to undertake the reaction of the amine of the formula

directly with the reaction product resulting from the dehydration without isolation thereof.

In the practice of the amine addition step, it is frequently convenient to undertake the reaction between the compounds of Formula III and the amines of the formula

in the presence of an excess of the amine in question, and it is likewise advantageous to undertake this reaction in a reaction medium as concentrated as possible with respect to the amine used in the reaction, e.g., dimethylamine. According to a particularly convenient modification of the method of the invention, the reaction mixture resulting from the dehydration is freed from solvent, e.g., by evaporation, whereafter the remainder containing the reaction product of Formula III is treated with an excess of amine of the formula

e.g., pure liquid dimethylamine, or the like.

As indicated by the following examples, the reaction temperature employed in the reaction of a compound of Formula III with the amine may be varied within wide limits, satisfactory yields being obtained at room temperature and increased temperatures as well. For example, the reaction may in certain cases be conducted at a temperature up to about 130 degrees centigrade in an autoclave, in other cases at the reflux temperature of the reaction mixture on a steam bath, and in other cases it may simply be allowed to stand at room temperature. The reaction time may also be varied over wide limits and will, of course, usually be in an inverse relation to the reaction temperature employed. An advantage of the employment of lower temperatures is that the compounds of the Formula I are obtained in a particularly satisfactory degree of purity.

When the compounds of Formula I are isolated in the form of their acid addition salts, preferably such acids are used the anions of which are non-toxic in therapeutic doses. Examples of such acid addition salts are hydrochlorides, hydrobromides, sulfates, phosphates, nitrates, acetates, lactates, maleates, citrates, tartrates, succinates and oxalates.

When the compounds of Formulas I and III are asymmetrically substituted in the xanthene or thiaxanthene ring system, they may be obtained from the reaction as a mixture of their cis and trans isomers. It is convenient to separate such mixtures into their individual isomers since these have often been found to differ with respect to their pharmacodynamic effects. For example, the isometric forms of 2-chloro-9-(3'-dimethylaminopropylidene)-thiaxanthene and 2-methoxy-9-(3'-dimethylaminopropylidene)-thiaxanthene show pharmacodynamic effects to a varying degree. In respect of each of the two last-mentioned thiaxanthenes, the isomer, which as the free base has the higher melting point, as shown in animal experiments a capacity of lessening motor activity to a considerably stronger degree than the corresponding ihomer with the lower melting point. For practical reasons, the isomers having the higher melting points as the free bases are called trans and those having the lower melting points are called cis isomers. The separation of the isomers is conveniently carried out by a fractional crystallization which in respect of the compounds of the Formula I may be carried out on the free bases and on acid addition salts thereof as well, it being usually possible to find a solvent in which the solubilities of the isomers differ to a suitable extent.

Thus, for example, the compound of Formula I, in which X designates sulfur, R a chlorine atom in the two-position, Y a hydrogen atom, and each of $R^1$ and $R^2$ designates a methyl group, may be obtained as a mixture of isomers which can be separated from each other, for example, by crystallization of a mixture of the bases from petroleum ether, the trans form being more sparingly soluble in this solvent than the cis form.

It is noted that thiaxanthenes are very often named in accordance with the nomenclature used in "Chemical Abstracts" prior to 1957 which nomenclature differs from that used herein in that the sulfur atom in the thiaxanthene ring system is designated by the number five and the carbon atom which connects the two benzene nuclei by the number ten.

As previously stated, when isolating the novel amines of the invention or any of the compounds of Formula I in the form of an acid addition salt, the acid is preferably selected so as to contain an anion which is non-toxic and pharmacologically acceptable, at least in usual therapeutic doses. Representative salts which are included in this preferred group are the hydrochlorides, hydrobromides, sulfates, acetates, phosphates, nitrates, quinates, methanesulfonates, ethanesulfonates, lactates, citrates, tartrates or bitartrates, and maleates of the compounds of Formula I. Other acid addition salts are likewise suitable and may be employed if desired. For example, furamic, benzoic, ascorbic, pamoic, succinic, salicylic, bismethylenesalicylic, propionic, gluconic, malic, malonic, mandelic, cinnamic, citraconic, stearic palmitic, itaconic, glycolic, benzenesulfonic, and sulfamic acids may also be employed as acid addition salt-forming acids. While it is preferred to isolate the compounds of the invention in the form of a solid or crystalline acid addition salt, if for any reason it is desired to obtain one of these amines in the form of its free base, this is ordinarily done according to conventional procedure, for example, by conducting the amination reaction in a solvent and thereafter evaporating the solvent to obtain the reaction product as a residue, usually an oil, or by dissolving the isolated hydrochloride or other salt in water, treating with a base such as ammonia, ammonium hydroxide, sodium carbonate or other suitable alkaline material, extracting the liberated base with a suitable solvent such as benzene, drying the extract, and evaporating to dryness in vacuo or fractionally distilling, or as indicated in any of the examples.

The following examples are given to illustrate the process and products of the present invention, but they are to be understood as exemplary only and are not to be construed as limiting.

EXAMPLE 1

*2-Chloro-9-Allylthiaxanthenol-(9); 2-Chloro-9-(Propene-3-Ylidene-1)-Thiaxanthene; 2-Chloro-9-(3'-Dimethylaminopropylidene)-Thiaxanthene*

Two hundred and eighty-eight grams of 2-chloro-9-allylthiaxanthenol-(9), melting at 77–78 degrees centigrade, are prepared by adding 2-chloro-thiaxanthone to an ether solution of allyl magnesium bromide followed by hydrolysis. The product is dissolved in two liters of anhydrous ether, whereafter 360 grams triethylamine are added. While stirring and cooling, 150 grams thionyl chloride dissolved in 500 milliliters ether are added gradually, allowing the temperature to rise to a maximum of minus ten degrees centigrade. After completion of addition, the ether solution is shaken three times with ice water, each time with 0.3 liter, whereafter it is dried with potassium carbonate. Thereafter, the ether is evaporated in vacuo and the 2-chloro-9-(propene-3-ylidene-1)-thiaxanthene formed is obtained as a light yellow syrup.

The said syrup is dissolved in 500 milliliters of anhydrous dimethylamine and the solution thereafter heated in an autoclave at 100 degrees centigrade for six hours. Upon cooling, excess dimethylamine is evaporated and the remainder dissolved in ether. The ether solution is shaken twice with water, whereafter the 2-chloro-9-(3'-dimethylaminopropylidene)-thiaxanthene formed is extracted with 1-N aqueous hydrochloric acid. After purification of the aqueous acid extract by means of activated carbon and subsequent filtration, the free base is separated by addition of a solution of ammonium hydroxide to an alkaline reaction. The base separates as an oil which is extracted with ether. After drying of the ether solution with potassium carbonate, the ether is evaporated and 236 grams of base are obtained as a colorless syrup. By dissolving the base in petrol and leaving the solution to stand, eighty grams of the trans form crystallize out as a white crystalline substance melting at 97–98 degrees centigrade. The corresponding hydrochloride is a white crystalline substance melting at 223–224 degrees centigrade. From the mother liquor from the trans base, the corresponding cis base can be obtained as a white crystalline substance melting at 47–48 degrees centigrade after recrystallization from ninety percent aqueous methanol. The corresponding hydrochloride melts at 207–208 degrees centigrade after recrystallization from ethanol. By repeated recrystallization from ethanol, the melting point is raised to 212–213 degrees centigrade.

EXAMPLE 2

2-Chloro-9-(Propene-3-Ylidene-1)-Thiaxanthene; 2-Chloro-9-(3'-N-Piperidinylpropylidene)-Thiaxanthene Twenty-seven grams 2-chloro-9-(propene-3-ylidene-1)-thiaxanthene, prepared as in Example 1, are dissolved in sixty grams anhydrous piperidine and the mixture is heated for eight hours at 120 degrees centigrade. The excess piperidine is distilled off in vacuo, the remainder is dissolved in ether, and the ether solution washed with water and extracted with dilute acetic acid. By neutralizing the acetic acid solution with dilute sodium hydroxide solution, 2-chloro-9-(3'-piperidinylpropylidene)-thiaxanthene is separated. This thiaxanthene is extracted with ether, the ether solution dried with potassium carbonate, ether evaporated therefrom, and the remainder dissolved in one hundred milliliters of ethanol. The ethanol solution is neutralized by a solution of hydrogen chloride in ethanol, whereupon a hydrochloride which is sparingly soluble in ethanol crystallizes out. This hydrochloride represents one of the two isomeric 2-chloro-9-(3'-N-piperidinylpropylidene)-thiaxanthenes and, after recrystallization from ethanol, it melts at 260–270 degrees centigrade with decomposition. The yield is 25 grams.

The corresponding hydrosulfate is prepared in a similar manner and, upon crystallization from ethanol, melts at 190–192 degrees centigrade.

The ethanolic mother liquor from the crystallization of the sparingly soluble hydrochloride is evaporated and the remainder dissolved in water, whereafter the aqueous solution is neutralized by dilute sodium hydroxide solution. The base thereby separated is extracted with ether, the ether phase is dried and evaporated, and the remainder dissolved in twenty milliliters of ethanol. The ethanol solution is neutralized by a solution of concentrated sulfuric acid in ether, whereupon a hydrosulfate precipitates which, after repeated recrystallization from ethanol, melts at 205–208 degrees centigrade. The yield is 2.4 grams. This hydrosulfate represents the other isomer of 2-chloro-9-(3'-N-piperidinylpropylidene)-thiaxanthene.

In the same manner using, instead of piperidine, a piperidine containing one or more methyl or other alkyl groups attached to a carbon atom of the piperidine ring, such as, for example, 2-methylpiperidine, 2-ethylpiperidine, 2,5-dimethylpiperidine, tetramethylpiperidine, or the like, there is produced a corresponding product containing a piperidine radical bearing one or more methyl or other alkyl groups.

EXAMPLE 3

2-Chloro-9-(Propene-3-Ylidene-1)-Thiaxanthene; 2-Chloro-9-(3'-N-Piperazinopropylidene)-thiaxanthene; 2-Chloro-9-[3'-(N'-2-Hydroxyethylpiperazino-N)-Propylidene]-Thiaxanthene and Salts Thereof; 2-Chloro-9-[3'-(N'-Methylpiperazino-N)-Propylidene]-Thiaxanthene and Salts Thereof Twenty-seven grams of 2-chloro-9-(propene-3-ylidene-1)-thiaxanthene, prepared as in Example 1, are mixed with fifty grams anhydrous piperazine and ten milliliters absolute ethanol and the mixture is heated for twelve hours at 120 degrees centigrade under reflux. After cooling, the solidified reaction mixture is treated with 500 milliliters of water and the mixture extracted with ether. From the ether solution, the 2-chloro-9-(3'-N-piperazinopropylidene)-thiaxanthene formed is extracted with dilute hydrochloric acid and precipitated as the base from the aqueous solution by rendering the solution alkaline. By extraction with ether, drying of the ether solution with potassium carbonate and evaporation of the ether, the free base (B) is obtained as a colorless oil in a yield of 21 grams. By addition of oxalic acid to a solution of the base in ethanol, the corresponding oxalate is obtained as a white crystalline substance melting at approximately 245 degrees centigrade with decomposition.

Thirty-five grams of the base (B) are dissolved in 200 milliliters of methanol. Five grams ethylene oxide are added and the mixture is left standing at room temperature for three hours. Thereafter, the reaction mixture is evaporated to approximately 100 milliliters and, after cooling, a solution of hydrogen chloride in methanol is added. Thereupon, the dihydrochloride of 2-chloro-9-[3'-(N'-2-hydroxyethylpiperazino-N)-propylidene] - thiaxanthene crystallizes out. After recrystallization from ethanol, it melts at 250–260 degrees centigrade with decomposition.

Twenty-six grams of the aforesaid base (B) are dissolved in a mixture of fifty milliliters of twenty percent methanolic formaldehyde and five grams formic acid. The mixture is boiled under reflux for four hours on a steam bath, whereafter it is evaporated in vacuo. The remainder is dissolved in 200 milliliters of acetone and a solution of anhydrous hydrogen chloride in ether is added dropwise thereto until no further crystallization takes place. In this manner the dihydrochloride of 2-chloro-9-[3'-(N'-methylpiperazino-N) - propylidene] - thiaxanthene is obtained in crystalline form.

EXAMPLE 4

2-Chloro-9-[3'-(N'-Methyl-N-Piperazino)-Propylidene]-Thiaxanthene

When using in Example 3, instead of piperazine, fifty grams N-methylpiperazine, 2-chloro-9-[3'-(N'-methyl-N-piperazino)-propylidene]-thiaxanthene is obtained in the same manner and found to be a light yellow syrup which is soluble in ether and sparingly soluble in methanol. By adding anhydrous hydrogen chloride to a solution of the base in acetone, the corresponding dihydrochloride is obtained as a white crystalline substance which is readily soluble in water. After recrystallization from ethanol, it melts at 250–260 degrees centigrade with decomposition. The corresponding maleate is a white crystalline substance which is sparingly soluble in water, ethanol, acetone and ether. At approximately 220 degrees centigrade, it shows a not well defined melting point with decomposition.

EXAMPLE 5

2-Chloro - 9 - [3'-(N'-2-Hydroxyethylpiperazino-N)-Propylidene]-Thiaxanthene and Salts Thereof; Its Acyl Derivative and Salts Thereof.

When using in Example 3, instead of piperazine, fifty grams N-2-hydroxyethylpiperazine and extracting the base with chloroform instead of ether, 2-chloro-9-[3'-(N'-2-hydroxyethylpiperazino-N)-propylidene]-thiaxanthene is obtained correspondingly as a colorless syrup which is sparingly soluble in ether and readily soluble in methanol. By adding anhydrous hydrogen chloride to a solution of the base in ethanol, the corresponding dihydrochloride is obtained as a white crystalline substance which is readily soluble in water. After recrystallization from ethanol, it melts at 250–260 degrees centigrade with decomposition.

Ten grams of this dihydrochloride are dissolved in the smallest possible volume of sixty degrees centigrade warm acetic acid and ten milliliters of acetyl chloride are added thereto, whereupon the mixture is heated for ten minutes on a steam bath. By evaporation in vacuo to a small volume and addition of 100 milliliters of acetone, the dihydrochloride of 2-chloro-9-[3'-(N'-2-acetoxyethylpiperazino-N)-propylidene]-thiaxanthene crystallizes as a white substance melting at 237–240 degrees centigrade.

In the same manner, starting with the 2-chloro-9-[3'-(N'-2-hydroxyethylpiperazino-N)-propylidene] - thiaxanthene of this example or the corresponding xanthene and reacting the same in the foregoing manner with other acylating agents, additional lower-aliphatic acyloxy-lower-alkylpiperazinyl compounds are prepared. Thus, in accord with usual acylation procedure, employing propionic, butyric, formic, isobutyric, valeric, caproic, heptanoic, or octanoic acids, or the acid anhydrides or acid chlorides corresponding thereto, the corresponding 2-chloro-9-[3'-(N'-2-lower-aliphatic acyloxy ethylpiperazino-N)-propylidene]-thiaxanthene or xanthene is prepared and isolated either in the form of its free base or in the form of an acid addition salt thereof.

As still other esters which may be prepared if desired by the esterification of the 2-hydroxy group of the product of Example 5 or the corresponding xanthene may be mentioned the benzoate, the methylbenzoate, the phenylacetate, the phenylpropionate, the cyclopentylacetate, the cyclohexylacetate, the cyclopentylpropionate, the cyclohexylpropionate, and the like, which are prepared in the same manner, by the reaction of the corresponding acid, acid anhydride, or acid chloride with the starting 2-chloro-9-[3'-(N' - 2 - hydroxyethylpiperazino-N)-propylidene]-thiaxanthene or xanthene.

EXAMPLE 6

*9-Allyl-thiaxanthenol - (9); 9 - (Propene-3-Ylidene-1)-Thiaxanthene; 9 - (3' - Dimethylaminopropylidene)-Thiaxanthene and Salts Thereof*

By adding thiaxanthone to an ether solution of allyl magnesium bromide followed by a hydrolysis of the magnesium complex thus formed with cold dilute hydrochloric acid, the compound 9-allyl-thiaxanthenol-(9) is prepared in the usual way and isolated as a syrupy substance by evaporating the ether solution which remains after hydrolysis. Upon crystallization from petroleum ether, it has a melting point of 52 degrees centigrade.

Twenty-five grams of this compound are treated with fifteen grams thionylchloride dissolved in fifty milliliters of ether as described in Example 1, 35 grams triethylamine in 300 milliliters anhydrous ether being added first. The 9-(propene-3-ylidene-1)-thiaxanthene thus formed is isolated as a yellow syrup and dissolved in forty milliliters of anhydrous dimethylamine. The solution is left standing for 48 hours at room temperature, whereafter excess dimethylamine is distilled off and the remainder is worked up as described in Example 1. In this manner, eighteen grams of 9 - (3'-dimethylaminopropylidene)-thiaxanthene are obtained as a yellow oil. The corresponding hydrochloride is obtained by adding anhydrous hydrogen chloride to an anhydrous ether solution of the base and, after recrystallization from ethanol, it is obtained as a white crystalline substance melting at 160–161 degrees centigrade.

EXAMPLE 7

*9-(Propene-3-Ylidene-1)-Thiaxanthene; 9-(3'-Piperazinopropylidene)-Thiaxanthene and Salts Thereof; 9-(N'-Methyl - 3 - Piperazinopropylidene)-Thiaxanthene and Salts Thereof; 9-[3'-N'-2-Hydroxyethylpiperazino-N)-Propylidene]-Thiaxanthene and Salts Thereof*

By reacting 23 grams of the 9-(propene-3-ylidene-1)-thiaxanthene, prepared according to Example 6, with fifty grams piperazine in the manner indicated in Example 3, 9-(3'-piperazinopropylidene)-thiaxanthene is obtained in the form of an oil. By dissolving the free base in ethanol and adding oxalic acid, the oxalate is obtained as a white crystalline substance melting at 240 degrees centigrade with decomposition. The oxalate is almost insoluble in ethanol and sparingly soluble in water.

The N'-methyl derivative of the free base can be prepared as follows: Twenty-two grams of the base are dissolved in a mixture of fifty milliliters of twenty per cent methanolic formaldehyde and five grams of formic acid. The mixture is boiled under reflux for four hours on a steam bath and is thereafter evaporated in vacuo. The remainder is dissolved in acetone. By adding dropwise a solution of anhydrous hydrogen chloride in ether, 9-(N'-methyl-3-piperazinopropylidene)-thiaxanthene is obtained in the form of the dihydrochloride which melts at 265–275° centigrade with decomposition.

The corresponding N'-hydroxyethyl derivative can be obtained as indicated in Example 3 by reacting the base with ethylene oxide and is obtained as a dihydrochloride melting at approximately 240 degrees centigrade with decomposition. The dihydrochloride is readily soluble in water but sparingly soluble in ethanol, chloroform and acetone. It can be recrystallized from 96% ethanol.

EXAMPLE 8

*2-Methylmercapto-9-Allylthiaxanthenol-(9); 2 - Methyl-Mercapto-9-(Propene-3-Ylidene-1) - Thiaxanthene; 2-Methylmercapto - 9-(3' - Dimethylaminopropylidene)-Thiaxanthene and Salts Thereof.*

Three hundred and sixty grams diphenyl disulfide dicarbonic acid are dissolved in 2.5 liters of concentrated sulfuric acid and, at fifty degrees centigrade, 800 grams thioanisole are added dropwise during the course of fifteen minutes while stirring. The mixture is heated with stirring for one hour at eighty to ninety degrees centigrade. Upon cooling, the reaction mixture is poured into fifteen liters of ice water and the resulting reaction mixture is extracted with ether. The ether solution is washed with dilute ammonium hydroxide solution, dried over potassium carbonate, treated with activated carbon and evaporated. The 2-methylmercapto-thiaxanthone formed is reacted with allyl magnesium bromide in ether. Upon subsequent hydrolysis of the magnesium complex, 2-methylmercapto-9-allylthiaxanthenol-(9) is obtained as a yellow syrup which does not crystallize upon cooling. Thirty grams of this substance are reacted with fifteen grams of thionylchloride in ether solution in the presence of 35 grams of triethylamine. Thereby, 2-methylmercapto-9-(propene-3-ylidenes-1)-thiaxanthene is obtained, which is reacted with fifty milliliters of pure anhydrous dimethylamine for 24 hours in an autoclave at fifty to sixty degrees centigrade. The reaction product is worked up in the manner described in Example 1, to yield 2-methylmercapto-9-(3'-dimethylaminopropylidene)-thiaxanthene as a yellow oil. The corresponding hydrochloride is obtained by adding a solution of anhydrous hydrogen chloride in ether to a solution of the base in benzene; it melts at 167.5 degrees centigrade after recrystallization from isopropanol. It is a white crystalline substance which is rather sparingly soluble in water and soluble in ethanol.

EXAMPLE 9

*2 - n - Butylmercapto - 9 - Allylthiaxanethenol - (9); 2 - n - Butylmercapto - 9 - (Propene - 3 - Ylidene - 1) - Thi - axanthene; 2 - n - Butylmercapto - 9 - (3' - Dimethyl - aminopropylidene)-Thiaxanthene and Salts Thereof*

When using in Example 8 one kilogram n-butylphenylsulfide instead of 800 grams thiosanisol, 2-n-butylmercaptothiaxanthone is obtained as a yellow crystalline substance melting at 64–66 degrees centigrade. By reacting this substance with allyl magnesium bromide followed by hydrolysis of the magnesium complex, 2-n-butylmercapto-9-allylthiaxanthenol-(9) is obtained as a yellow syrup. Thirty-two grams of this substance are reacted with fifteen grams of thionylchloride in ether solution in the presence of 35 grams triethylamine. By proceeding as described in Example 8, 2-n-butylmercapto-9-(3'-dimethylaminopropylidene)-thiaxanthene is obtained as a light yellow oil. The corresponding hydrochloride is obtained by adding a solution of anhydrous hydrogen chloride in ether to a solution of the base in acetone. When left standing for a prolonged time, the hydrochloride crystallizes out. It is a white crystalline substance melting at 130–145 degrees centigrade. The corresponding oxalate, which is obtained by reacting the base in acetone with oxalic acid, melts at 135–142 degrees centigrade and is rather sparingly soluble in water. By recrystallizing the hydrochloride melting at 130–145 degrees centigrade three times from isopropanol, a hydrochloride is obtained melting at 156.5–158 degrees centigrade. Further recrystallization does not raise the melting point. From the mother liquor from the first recrystallization, a hydrochloride is precipitated by the addition of ether. By recrystallizing this hydrochloride three times from benzene, a hydrochloride is obtained which is isomeric with that mentioned previously in this example; it melts at 152.5–154 degrees centigrade.

A mixture of even parts of the two isomeric hydrochlorides melts at 129–134 degrees centigrade. The bases corresponding to the two isomeric hydrochlorides are obtained as colorless oils.

EXAMPLE 10

*2-Chloro-9-Allylthiaxanthenol-(9); 2-Chloro-9-(Propene-3-Ylidene-1)-Thiaxanthene; 2-Chloro-9-(3'-Dimethylaminopropylidene)-Thiaxanthene and Salts Thereof*

One hundred grams of 2-chloro-9-allythiaxanthenol-(9) are dissolved in 100 milliliters toluene and one milliliter of acetyl chloride is added at 35 degrees centigrade. After five to ten minutes, a reaction sets in whereby the temperature rises approximately ten degrees centigrade and the reaction mixture becomes very turbid. After further standing for ten to fifteen minutes, the mixture is transferred to an autoclave and, after cooling to zero degrees centigrade, 150 milliliters of liquid dimethylamine are added with caution while stirring. The autoclave is closed and heated at 100 degrees centigrade for sixteen hours. The autoclave is emptied and the reaction mixture is freed from dimethylamine by being heated to approximately 100 degrees centigrade. Acetic acid is added to the remainder to acid reaction and thereafter three to four volumes of ether are added. The reaction mixture is extracted repeatedly with water and the combined aqueous extracts are neutralized by adding sodium hydroxide solution thereto to a basic reaction. Thereupon an oil separates and is isolated by extraction with ether, drying and evaporation in vacuo of the ether solution. The isolated oil is dissolved in acetone and, while stirring, a solution of hydrogen chloride in acetone is added to neutralization. After standing, a crystalline mixture of the two isomeric forms of 2-chloro-9-(3'-dimethylaminopropylidene)-thiaxanthene, in the form of their hydrochlorides, separates and is filtered off. Total yield is 69 grams. The mixture of the hydrochlorides is dissolved in water and the aqueous solution is neutralized with sodium hydroxide solution. The oil thereby separated is extracted with ether, the ether solution is dried and the ether evaporated, whereupon the remainder is dissolved in 200 milliters of petroleum ether. Upon cooling, nineteen grams of the high melting isomer of 2-chloro - 9 - (3' - dimethylaminopropylidene) - thiaxanthene, melting at 94–96 degrees centigrade, crystallize out.

EXAMPLE 11

*Process Run Indicative of High Yields*

One hundred grams of 2-chloro-9-allythiaxanthenol-(9) are dissolved in 100 milliliters of toluene and a mixture consisting of one milliliter acetyl chloride and forty milliliters acetic acid anhydride is added thereto while stirring at 35 degrees centigrade. After standing for approximately five to thirty minutes, a temporary turbidity is noticed and the temperature rises to approximately eighty degrees centigrade. After about another ten minutes, the reaction mixture is treated with dimethylamine in an autoclave exactly as described in Example 10. One hundred and five grams of a mixture of the hydrochlorides of the two forms of 2-chloro-9-(3'-dimethylaminopropylidene) - thiaxanthene are obtained. This corresponds to 86% of the theoretical yield. Upon treating this hydrochloride as described in Example 10, fifty grams of the high melting isomer of 2-chloro-9-(3'-dimethylaminopropylidene)-thiaxanthene, melting at 94–96 degrees centigrade, are obtained.

EXAMPLE 12

*2-Bromo-9-Allylthiaxanthenol-(9); 2-Bromo-9-(Propene-3-Ylidene-1)-Thiaxanthene; 2-Bromo-9-(3'-Dimethylaminopropylidene)-Thiaxanthene and Salts Thereof*

Thirty-three and three-tenths grams (0.1 mol) of 2-bromo - 9 - allylthiaxanthenol - (9) (melting point 55–56 degrees centigrades), prepared by adding 2-bromothiaxanthone to a solution of allyl magnesium bromide in ether followed by hydrolysis, are dissolved in thirty milliliters of toluene and, at thirty degrees centigrade, a mixture consisting of twelve milliliters acetic acid anhydride and 0.1 milliliter concentrated sulfuric acid is added. The mixture is shaken and left standing at room temperature for one hour, whereafter the 2-bromo-9-(propene-3-ylidene-1)-thiaxanthene thus produced is treated in situ as described in Example 10, using fifty milliliters dimethylamine instead of 150 milliliters. Excess dimethylamine is evaporated and the remainder is dissolved in ether and extracted with dilute acetic acid. From the acetic acid solution, the base is precipitated by means of dilute sodium hydroxide solution. It is extracted with ether and the ether solution is dried and evaporated. The remainder is dissolved in fifty milliliters of petroleum ether and cooled, whereby 9.2 grams of a base melting at 89–92 degrees centigrade are crystallized out. After recrystallization from ethanol, 7.5 grams of a base melting at 92–94 degrees centigrade are obtained. This base represents one of the two possible isomeric 2-bromo-9-(3' - dimethylaminopropylidene) - thiaxanthenes. The corresponding hydrochloride crystallizes from ethanol and melts at 222–224 degrees centigrade with decomposition. By evaporating the mother liquor from the first crystallization of base to a volume of fifteen milliliters followed by cooling, 6.1 grams of base, melting at 53–57 degrees centigrade, crystallize out. After recrystallization from methanol, five grams of base melting at 58–60 degrees centigrade are obtained. This base represents the other isomer of 2-bromo-9-(3'-dimethylaminopropylidene-)thiaxanthene. The corresponding hydrochloride crystallizes from ethanol and melts at 200–201 degrees centigrade.

EXAMPLE 13

*2-Methoxy-9-Allylthiaxanthenol-(9); 2-Methoxy-9-(Propene-3-Ylidene-1)-Thiaxanthene; 2-Methoxy-9-(3'-Dimethylaminopropylidene) - Thiaxanthene and Salts Thereof*

Twenty-eight and four-tenths grams (0.1 mol) of 2-methoxy-9-allylthiaxanthenol-(9), prepared by adding 2-methoxy-thiaxanthone to a solution of allyl magnesium bromide in ether followed by hydrolysis, are dissolved in thirty milliliters of chloroform whereafter a solution of 25 grams boric acid triacetate in thirty milliliters of chloroform is added. The solution assumes a bright red color but, on being left to stand, the color disappears. After the reaction mixture has been left standing at room temperature for one hour, it is evaporated in vacuo and the remainder, consisting of 2-methoxy-9-(propene-3-ylidene-1)-thiaxanthene, is treated with fifty milliliters of dimethylamine as described in Example 12. Excess of dimethylamine is evaporated, and the residue is dissolved in ether and extracted with dilute acetic acid. From the acetic acid solution, the base is separated with dilute sodium hydroxide solution, extracted with ether, and the ether solution dried. The tartrates are separated from the ether solution by neutralization thereof with a solution of tartaric acid in ethanol. The tartrates are dissolved in the smallest possible amount of boiling water. Upon cooling, a tartrate which is sparingly soluble in water crystallizes out. It contains water of crystallization and therefore shows a not well defined melting point of 120–130 degrees centigrade. This tartrate represents one of the two isomeric 2-methoxy-9-(3'-dimethylaminopropylidene)-thiaxanthenes. The base is isolated by dissolving the tartrate in water, precipitating the base by means of dilute sodium hydroxide solution and extracting it with ether, whereafter the ether solution is dried and evaporated. Upon dissolving the remainder in fifty milliliters of petroleum ether and cooling, fourteen grams of base with the melting point 76–77 degrees centigrade crystallize out. The hydrochloride crystallizes from acetone and melts at 172–173 degrees centigrade.

The aqueous mother liquor from the crystallization of the tartrate contains a tartrate which is readily soluble in water and which has not been recovered in a crystalline state. The base is precipitated by means of dilute sodium hydroxide solution, extracted with ether, the ether solution dried and evaporated, the remainder dissolved in 25 milliliters absolute ethanol. The ethanol solution is neutralized by a solution of hydrogen chloride in ethanol, whereby twelve grams of a hydrochloride melting at 178–180 degrees centigrade crystallize out. After recrystallization from ethanol, ten grams of hydrochloride melting at 180–181 degrees centigrade are obtained. This hydrochloride represents the other of the two isomeric 2-methoxy-9-(3'-dimethylaminopropylidene)-thiaxanthenes.

EXAMPLE 14

*2-Chloro-9-Allylthiaxanthenol-(9); 2-Chloro-9 - (3' - Dimethylaminopropylidene) - Thiaxanthene and Salts Thereof*

Twenty-nine grams (0.1 mol) of 2-chloro-9-allylthiaxanthenol-(9) are dissolved in 500 milliliters of toluene. Ten grams of boric acid are added and the mixture is heated under reflux for three hours. Thereafter, the toluene is distilled off in vacuo and the remainder is treated with fifty milliliters of dimethylamine as described in Example 12. By working up the reaction mixture as described in Example 10, 10.2 grams of a mixture of the hydrochlorides of the two isomeric 2-chloro-9-(3'-dimethylaminopropylidene)-thiaxanthenes are obtained.

EXAMPLE 15

*2-Methylmercapto-9-Allylthiaxanthenol- ( 9); 2 - Methylmercapto-9-(3'-Dimethylaminopropylidene) - Thiaxanthene and Salts Thereof*

Thirty grams (0.1 mol) of 2-methylmercapto-9-allylthiaxanthenol-(9) are dissolved in thirty milliliters of toluene and heated at 105–110 degrees centigrade. Thereafter, 0.4 gram of oxalic acid are added, whereupon a vigorous reaction occurs with boiling of the solvent and formation of a milky turbidity. After ½ minute, the reaction mixture is cooled and treated with fifty milliliters of dimethylamine as described in Example 12. The base is isolated as described in Example 10. It is dissolved in benzene and neutralized with a solution of anhydrous hydrogen chloride in ether, whereby the hydrochloride of 2-methylmercapto-9-(3'-dimethylaminopropylidene) - thiaxanthene is crystallized out. After recrystallization from isopropanol, nineteen grams of the hydrochloride are obtained, melting at 166–167 degrees centigrade.

EXAMPLE 16

*2-Chloro-9-Allylthiaxanthenol-(9); 2-Chloro-9-(3'-N-Pyrrolidinylpropylidene)-Thiaxanthene and Salts Thereof*

Twenty-nine grams of 2-chloro-9-allylthiaxanthenol-(9) are dissolved in thirty milliliters of toluene and 0.6 milliliter of trichloroacetic acid are added thereto. The mixture is heated to forty degrees centigrade, whereupon a turbidity occurs. After the reaction mixture has been left standing at room temperature for one hour, 100 milliliters of pyrrolidine are added and the mixture is heated under reflux on a steam bath for sixteen hours. Excess pyrrolidine is evaporated in vacuo, the remainder dissolved in ether, and the ether solution extracted with dilute acetic acid. The base is precipitated from the acetic acid solution with sodium hydroxide solution and extracted with ether; the ether phase is dried and evaporated. The remainder is dissolved in fifty milliliters of ethanol and the ethanol solution neutralized with a solution of hydrogen chloride in ethanol, whereby twelve grams of a hydrochloride, which is sparingly soluble in ethanol and melts at 244–248 degrees centigrade with decomposition, crystallize out. This hydrochloride represents one of the two isomeric 2-chloro-9-(3'-N-pyrrolidinylpropylidene)-thiaxanthenes. The corresponding base melts at 69–71 degrees centigrade.

The mother liquor is evaporated to a volume of approximately ten milliliters, and twenty milliliters of ether are added thereto. Four grams of a hydrochloride crystallize out and, upon recrystallization from water, are found to melt at 180–182 degrees centigrade. This hydrochloride represents the other isomer of 2-chloro-9-(3'-N-pyrrolidinylpropylidene)-thiaxanthene, and its corresponding base melts at 85–86 degrees centigrade.

In exactly the same way as given in the foregoing, starting with pyrrolidines which are substituted on a ring carbon atom, for example, 2-methylpyrrolidine, 2-ethylpyrrolidine, 2,4-dimethylpyrrolidine, 2,3,4,5-tetramethylpyrrolidine, 2,3-dimethylpyrrolidine, or the like, the corresponding compound which contains a methyl or other alkyl group or groups in the pyrrolidine ring is thereby produced.

EXAMPLE 17

*2 - Chloro - 9 - Allylthiaxanthenol - (9); 2 - Chloro - 9- (Propene - 3 - Ylidene - 1) - Thiaxanthene; 2 - Chloro-9 - (3' - Dimethylaminopropylidene) - Thiaxathene and Salts Thereof*

Twenty-nine grams of 2-chloro-9-allylthiaxanthenol-(9) are dissolved in thirty milliliters of ethanol, and five grams anhydrous citric acid are added thereto. The reaction mixture is heated on a steam bath for five minutes. In this manner, 2-chloro-9-(propene-3-ylidene-1)thiaxanthene separates as an oil. The reaction mixture is cooled and treated with fifty milliliters of dimethylamine as described in Example 12. Yield: 3.6 grams of the hydrochlorides of a mixture of the two isomeric 2-chloro-9-(3'-dimethylaminopropylidene)-thiaxanthenes.

EXAMPLE 18

*2 - Chloro - 9 - Allylthiaxanthenol - (9); 2 - Chloro - 9- (3'-Monomethylaminopropylidene)-Thiaxanthene and Salts Thereof*

One hundred grams of 2-chloro-9-allylthiaxanthenol-(9) are dissolved in 100 milliliters of ethanol. The mixture is heated to boiling and 0.25 milliliter of concentrated hydrochloric acid are added, whereupon a reaction takes place with boiling and separation of an oil. After fifteen seconds, the reaction mixture is cooled in ice, whereafter it is treated in an autoclave with 150 milliliters of anhydrous monomethylamine at 90 degrees centigrade for sixteen hours. Excess methylamine is evaporated, the remainder is dissolved in ether, and the ether solution is extracted with dilute acetic acid. The base is precipitated from the acetic acid solution by means of dilute sodium hydroxide solution and extracted with ether. The ether phase is dried over potassium carbonate, evaporated, and the remainder dissolved in 300 milliliters of ethanol. The base is neutralized with a solution of anhydrous hydrogen chloride in ether. Upon standing and cooling, a hydrochloride crystallizes out which is removed by vacuum filtration. After recrystallization once from water and once from ethanol, 31 grams of hydrochloride melting at 195–196 degrees centigrade are obtained. This hydrochloride represents one of the two isomeric 2-chloro-9-(3'-monomethylaminopropylidene)-thiaxanthenes. By evaporation of the mother liquor, a further 25 grams of hydrochloride are obtained. This hydrochloride shows a lower melting range (175–185 degrees centigrade) and is believed to be a mixture of the two isomers.

EXAMPLE 19

*2 - Methoxy - 9 - Allylthiaxanthenol-(9); 2 - Methoxy - 9- (3'-N-Piperazinylpropylidene)-Thiaxanthene and Salts Thereof*

Twenty-eight and four-tenths grams (0.1 mol) of 2-methoxy-9-allylthiaxanthenol-(9) are dissolved in 25 milliliters of toluene, and a mixture of ten grams of acetic acid anhydride and 0.2 gram of acetyl chloride is added thereto at 35 degrees centigrade. The mixture is left standing for some time, whereafter a reaction commences as described in Example 11. After completion of this reaction, fifty grams of anhydrous piperazine and five milliliters of ethanol are added and the reaction mixture is heated under reflux for sixteen hours at 125 degrees centigrade. The 2-methoxy-9-(3'-N-piperazinylpropylidene)-thiaxanthene formed is isolated in the form of the free base as described in Example 3. It is a yellow oil; yield, 27 grams. The base is dissolved in 200 milliliters of ethanol and neutralized with a solution of maleic acid in ethanol. The maleate is isolated as a white crystalline substance melting at 158–160 degrees centigrade.

In the same manner, starting from an appropriate C-methyl or other C-alkyl-substituted piperazine, the corresponding product is obtained in which the piperazine ring is C-substituted by one or more methyl or other alkyl groups.

EXAMPLE 20

*2-Methoxy-9-[3'-N-(N'-Methyl)-Piperazinylpropyl idene]-Thiaxanthene and Salts Thereof*

When using in Example 19, instead of piperazine, 100 grams of N-methyl-piperazine, 2-methoxy-9-[3'-N-(N'-methyl)-piperazinylpropylidene]-thiaxanthene is obtained in the form of the free base as a yellow syrup; yield, 25 grams. By dissolving the base in 200 milliliters of ethanol and neutralizing to pH 4 with a solution of hydrogen chloride in ethanol, the dihydrochloride crystallizes as a white substance melting at 233–236 degrees centigrade.

EXAMPLE 21

*2-Methoxy-9-[3'-N-(N'-2-Hydroxyethyl)Piperazinylpropylidene]-Thiaxanthene and Salts Thereof*

Thirty-five grame (0.1 mol) of 2-methoxy-9-(3'-N-piperazinylpropylidene)-thiaxanthene are dissolved in 250 milliliters of ethanol. Then 4.8 grams of ethylene oxide (0.11 mol) are added, and the mixture is left standing at room temperature for five hours, whereafter the reaction mixture is evaporated to half of its original volume and the mixture is neutralized to pH 4 with a solution of hydrogen chloride in ethanol. Thereby, the slightly soluble dihydrochloride of 2-methoxy-9-[3'-N-(N'-2-hydroxyethyl)-piperazinylpropylidene]-thiaxanthene is crystallized out as a white substance melting at 242–245 degrees centigrade.

In the same manner as given above, other 2-lower alkoxy - 9 - [3' - N - (N' - 2 - hydroxyethyl) - piperazinylpropylidene]-thiaxanthenes and salts thereof are prepared by substituting the corresponding 2-lower-alkoxy-9-(3'-N-piperazinylpropylidene)-thiaxanthene for the 2-methoxy starting material employed therein. In this manner, the corresponding 2-ethoxy, 2-propoxy, 2-butoxy, 2-amyloxy, 2-isoamyloxy, 2-hexyloxy, 2-heptyloxy, 2-octyloxy - 9 - [3' - N - (N' - 2 - hydroxyethyl) - piperazinylpropylidene]-thiaxanthenes are prepared and separated in the form of either the free base or an acid addition salt thereof. The starting 2-alkoxy-9-(3'-N-piperazinylpropylidene)-thiaxanthenes are prepared from the corresponding 2-alkoxy-thiaxanthones in the same manner as given in Examples 13 and 19.

EXAMPLE 22

*2 - Chloro - 9 - Allylxanthenol - (9); 2 - Chloro - 9 - (Propene - 3 - Ylidene - 1) - Xanthene; 2 - Chloro - 9 - (3'-Dimethylaminopropylidene)-Xanthene and Salts Thereof*

Twenty-seven grams (0.1 mol) of 2-chloro-9-allylxanthenol-(9), which is prepared as a yellow oil by adding 2-chloro-xanthone to a solution of allyl magnesium bromide in ether, hydrolyzing the reaction mixture with a saturated aqueous solution of ammonium chloride, and evaporating the ether phase, are dissolved in 25 milliliters of toluene, and a mixture of ten grams of acetic acid anhydride and 0.2 gram of acetyl chloride is added as described in Example 19. Upon complete reaction to the 2-chloro-9-(propene-3-ylidene-1)-xanthene, the mixture is heated in an autoclave with fifty milliliters of anhydrous dimethylamine at 90–95 degrees centigrade for sixteen hours. The reaction mixture is treated as described in Example 1 to give 2-chloro-9-(3'-dimethylaminopropylidene)-xanthene in the form of the free base as a light yellow oil in a yield of 24 grams. By dissolving the base in petroleum ether and cooling, it is obtained as a white crystalline substance melting at 53–54 degrees centigrade. The corresponding hydrochloride is obtained, by neutralizing a solution of the base in ethanol with a solution of hydrogen chloride in ethanol, as a white crystalline substance melting at 198–200 degrees centigrade.

EXAMPLE 23

*2-Methoxy-9-Allylxanthenol-(9); 2-Methoxy-9-(Propene-3 - Ylidene-1)-Xanthene; 2 - Methoxy-9-(3'-Dimethylaminopropylidene)-Xanthene and Salts Thereof*

When preparing and using in Example 22, instead of 2 - chloro - 9 - allylxanthenol - (9), 27 grams of 2-methoxy-9-allylxanthenol-(9), produced in accord with Example 13 from 2-methoxyxanthone, the product 2-methoxy-9-(3'-dimethylaminopropylidene)-xanthene is obtained as a yellow oil in a yield of 22 grams. By dissolving the base in fifty milliliters of ethanol and neutralizing with a solution of hydrogen chloride in ethanol, a hydrochloride is obtained and filtered off in a yield of sixteen grams. The base corresponding to this hydrochloride is obtained by dissolving the hydrochloride in water, making the solution alkaline with sodium hydroxide, extracting with ether, drying the ether phase, evaporating the ether, dissolving the residue in fifty milliliters of petroleum ether and allowing the solution to stand at minus thirty degrees centigrade. It is obtained as a white crystalline substance in a yield of twelve grams and melts at 37–39 degrees centigrade. This base represents one of the two isomers of 2-methoxy-9-(3'-dimethylaminopropylidene) - xanthene. The corresponding hydrochloride melts after recrystallization from ethanol at 197–198 degrees centigrade.

The mother liquor from the crystallization of the aforesaid sixteen grams of hydrochloride is evaporated to approximately twenty milliliters and cooled, resulting in the separation and crystallization of a hydrochloride melting at 184–190 degrees centigrade. The mother liquor from this hydrochloride is evaporated to dryness, the residue dissolved in water, and the base precipitated with dilute sodium hydroxide solution. The base is extracted with ether, the ether phase dried over potassium carbonate, and the ether evaporated. The residue is dissolved in ten milliliters of ethanol and neutralized with a solution of oxalic acid in ethanol. The oxalate which separates out is filtered off and melts after recrystallization from water at 165 degrees centigrade. Yield, three grams. The oxalate is converted to the corresponding base as described above for the hydrochloride, and obtained as a colorless oil which does not crystallize. The base is dissolved in a mixture of five milliliters of ethanol and five milliliters of ether and neutralized with a solution of hydrogen chloride in ether. The hydrochloride which separates out is filtered off and melts at 150–151 degrees centigrade. The hydrochloride which melts at 150–151 degrees centigrade and the oxalate which melts at 165 degrees centigrade represent the other of the isomeric 2 - methoxy - 9 - (3' - dimethylaminopropylidene)-xanthenes.

EXAMPLE 24

*2 - Chloro-9-Allylxanthenol-(9); 2-Chloro-9-(Propene-3-Ylidene - 1) - Xanthene; 2 - Chloro-9-[3'-N-(N'-2-Hydroxyethyl) - Piperazinylpropylidene] - Xanthene and Salts Thereof*

From 27 grams of 2-chloro-9-allylxanthenol-(9), water is split off as described in Example 17 to produce 2-chloro-9-(propene-3-ylidene-1)-xanthene. To the resulting product are added one hundred grams of N-(2-hydroxyethyl)-piperazine, whereafter the reaction mixture is heated at 130 degrees centigrade for sixteen hours. The 2 - chloro - 9 - [3'-N-(N'-2-hydroxyethyl)-piperazinylpropylidene]-xanthene produced is isolated in the form of the free base as described in Example 3. It is a yellow oil; yield, 21 grams. The base is dissolved in 100 milliliters of ethanol and, upon neutralization of the base with a solution of hydrogen chloride in ethanol to pH 4, the dihydrochloride crystallizes as a white substance melting at 240–250 degrees centigrade.

EXAMPLE 25

*2,7-Dichloro - 9 - Allylthiaxanthenol-(9); 2,7-Dichloro-9-(Propene-3-Ylidene-1) - Thiaxanthene; 2,7 - Dichloro-9-(3'-Dimethylaminopropylidene) - Thiaxanthene and Salts Thereof*

Twenty-eight and one-tenth grams (0.1 mol) of 2,7-dichlorothiaxanthone, which is prepared by chlorination of 2-chlorothiaxanthone in glacial acetic acid and which melts at 250–251 degrees centigrade upon recrystallization from chloroform, are reacted with allyl magnesium bromide and followed by a hydrolysis of the magnesium complex thus produced to give 19.5 grams of 2,7-dichloro-9-allylthiaxanthenol-(9), which melts at 115–116 degrees centigrade after recrystallization from a mixture of equal parts of ether and petroleum ether. To a solution of 19.5 grams of 2,7-dichloro-9-allylthiaxanthenol-(9) in 25 milliliters of toluene is added a mixture of ten grams of acetic acid anhydride and 0.2 gram of acetyl chloride at 35 degrees centigrade. The mixture is left standing for some time, whereafter a reaction sets in as described in Example 11. After completion of the reaction, the mixture is allowed to cool and 15.6 grams of 2,7 - dichloro - 9 - (propene-3-ylidene-1)-thiaxanthene crystallize as a white substance melting at 120–124 degrees centigrade. Ten grams of this substance are treated with twenty grams of dimethylamine for ten hours in an autoclave at 100 degrees centigrade. After evaporation of excess dimethylamine and recrystallization of the residue from petroleum ether, 8.6 grams of 2,7-dichloro-9-(3'-dimethylaminopropylidene)-thiaxanthene, melting at 100–101 degrees centigrade, are isolated. The corresponding hydrochloride melts at 229–231 degrees centigrade.

EXAMPLE 26

*Other Mono and Dihalo-9-[3'(N'-2-Hydroxyethylpiperazino-N)-Propylidene]-Thiaxanthenes and Xanthenes*

In the same manner as given in Example 3, the compounds 3 - chloro - 9 - [3' - (N'-2-hydroxyethylpiperazino-N) - propylidene]-thiaxanthene, 2-fluoro-9-[3'-(N'-2-hydroxyethylpiperazino-N)-propylidene] - thiaxanthene, 2-chloro - 9 - [3'-(N'-2-hydroxyethylpiperazino-N)-propylidene]-xanthene, 2-fluoro-9-[3'-(N'-2-hydroxyethylpiperazino-N)-propylidene] - xanthene, 2 - bromo-9-[3'-(N'-2-hydroxyethylpiperazino-N)-propylidene] - xanthene, and 2,7 - dichloro-9-[3'-(N'-2-hydroxyethylpiperazino-N)-propylidene]-xanthene are prepared by respectively employing as starting materials, for reaction with ethylene oxide, 3 - chloro - 9 - (3'-N-piperazinopropylidene)-thiaxanthene, 2 - fluoro - 9 - (3'-N-piperazinopropylidene)-thiaxanthene, 2 - chloro-9-(3'-N-piperazinopropylidene)-xanthene, 2 - fluoro - 9 - (3' - N-piperazinopropylidene)-xanthene, 2 - bromo - 9 - (3'-N-piperazinopropylidene)-xanthene, and 2,7 - dichloro - 9 - (3'-N-piperazinopropylidene)-xanthene. Their acid addition salts are produced and isolated in the manner of Examples 1, 3, 5, 7, 21 and 24, using for example, hydrochloric, hydrobromic, sulfuric, acetic, nitric, phosphoric, lactic, citric, quinic, tartaric, malonic, oxalic, methane or ethanesulfonic or like acids, or their free bases may be obtained as indicated in the foregoing, for example, by evaporation of the reaction solvent solution thereof to dryness, leaving the free base as a residue, or by dissolving the hydrochloride or other suitable salt in water, neutralizing with base, for example, sodium hydroxide, extracting with a suitable solvent, for example, ether, drying the extract and evaporating slowly in vacuo or fractionally distilling. The same products are produced by reacting the appropriately substituted 9-(propene-3-ylidene-1)-thiaxanthene with N-2-hydroxyethylpiperazine in accord with Example 5.

EXAMPLE 27

*Other Acid Addition Salts and Free Bases*

In the same manner as given in the foregoing examples, other acid addition salts of the compounds of Examples 1 through 25 are prepared by employing other acids in place of the hydrogen chloride and other acids used therein. For example, by employing hydrobromic, sulfuric, acetic, phosphoric, nitric, lactic, citric, tartaric, malonic, quinic, oxalic, methane or ethanesulfonic or like acids, the corresponding acid addition salts of the free bases of Examples 1 through 25 are produced. If desired, the free bases are obtained or regenerated either by the procedure indicated in the foregoing Example 26 or elsewhere in the specification.

EXAMPLE 28

*2-Chloro-9-(3'-N-Morpholinylpropylidene)-Thiaxanthene*

In the same manner as given in Example 2 using, instead of the sixty grams of piperidine, sixty grams of morpholine, 2 - chloro-9-(3'-N-morpholinylpropylidene)-thiaxanthene is obtained as an oil by neutralization of the acetic acid solution with dilute sodium hydroxide solution. The oil is taken over in ether, the ether solution dried with potassium carbonate and the ether evaporated. The residue is dissolved in acetone, and the acetone solution neutralized with a solution of hydrogen chloride in acetone. In this manner, a hydrochloride of 2-chloro-9-(3'-N-morpholinylpropylidene)-thiaxanthene is obtained as a white crystalline substance which melts at 209–211 degrees centigrade. This hydrochloride represents one of the possible isomers. The corresponding hydrobromide melts at 217–218 degrees centigrade.

From the mother liquor from the crystallization of the hydrochloride melting at 209–211 degrees centigrade, the acetone is evaporated on a steam bath. The residue is dissolved in water. By neutralization of the aqueous solution with dilute sodium hydroxide solution, an oil separates out. The oil is taken over in ether, the ether solution dried with potassium carbonate, whereupon a hydrobromide of 2 - chloro-9-(3'-N-morpholinylpropylidene)-thiaxanthene is precipitated by neutralization with a solution of hydrogen bromide in ethanol. After recrystallization from ethanol, this hydrobromide melts at 178–180 degrees centigrated. Yield, three grams. The said hydrobromide represents the other of the possible isomers.

EXAMPLE 29

*2-Chloro-9-(3'-N-Thiamorpholinylpropylidene)-Thiaxanthene*

In the same manner as given in Example 28, using instead of the sixty grams of morpholine, 75 grams of thiamorpholine, there is obtained 2-chloro-9-(3'-N-thiamorpholinylpropylidene)-thiaxanthene, which is worked up in the manner of Example 28 and isolated either in the form of its free base or in the form of an acid addition salt thereof.

EXAMPLE 30

*2 - Methoxy-9-[3'-N-(N'-2-Hydroxypropyl)-Piperazinylpropylidene]-Thiaxanthene and Salts and Acylates Thereof*

In the same manner as given in Example 21 using, instead of the 4.8 grams of ethylene oxide, 6.3 grams of propylene oxide, the compound 2-methoxy-9-[3'-N-(N'-2-hydroxypropyl)-piperazinylpropylidene]thiaxanthene is produced and worked up in the manner of Example 21 and separated either in the form of its free base or in the form of an acid addition salt thereof.

If desired, this product may be acylated in the manner of Example 5 using propionyl chloride in propionic acid to give 2-methoxy-9-[3'-N(N'-2-propionoxypropyl)-piperazinylpropylidene]-thiaxanthene, which may be worked up and isolated after the manner of Example 5 in the form of its hydrochloride acid addition salt.

EXAMPLE 31

*2-Chloro-9-[3'-(N'-3-Hydroxypropylpiperazino-N)-Propylidene]-Thiaxanthene and Salts Thereof*

In the same manner as given in Example 3, the product 2 - chloro-9-[3'-(N'-3-hydroxypropylpiperazino-N)-propylidene]-thiaxanthene is prepared by the reaction of 2-chloro - 9-(3'-N-piperazinopropylidene)-thiaxanthene and an equivalent amount of trimethylenebromohydrin in known manner for conducting such amine alkylation reactions. The product is worked up as indicated in Example 3 and separated either in the form of its free base or in the form of an acid addition salt thereof.

EXAMPLE 32

*2-Chloro-9-[3'-(N'-4-Hydroxybutylpiperazino-N)-Propylidene]-Thiaxanthene, Salts and Acylates Thereof*

In the same manner as given in Example 5, but using instead of the fifty grams of N-2-hydroxyethylpiperazine an equivalent amount of N-4-hydroxybutylpiperazine, and working up in the same manner as indicated in Example 5, the product 2-chloro-9-[3'-(N'-4-hydroxybutylpiperazino-N)-propylidene]thiaxanthene is prepared and separated either in the form of its free base or in the form of an acid addition salt, e.g., a hydrochloride, thereof. If desired, this compound may be reacted with a lower-aliphatic acid or an acid anhydride or acid chloride corresponding thereto, in the manner of Example 5, to produce the corresponding lower-aliphatic acyloxy compound, for example, the N'-4-acetoxybutylpiperazino compound.

EXAMPLE 33

*2-Methylmercapto and 2-Butylmercapto-9-[3'-N-(N'-2-Hydroxyethyl)- Piperazinylpropylidene]-Thiaxanthenes and Salts and Acylates Thereof*

In the same manner as given in Example 21, these compounds are prepared by the reaction of equimolar amounts of ethylene oxide and 2-methylmercapto or 2-butylmercapto - 9 - (3' - N - piperazinylpropylidene)-thiaxanthene, which is in turn prepared from piperazine and 2-methylmercapto or 2-butylmercapto-9-allylthiaxanthenol-(9), in turn prepared as indicated in Example 8 and 9, starting from diphenyl disulphide dicarbonic acid and thioanisole or N-butylphenylsulphide. Either the 2-methylmercapto or 2-butylmercapto-9-(3'-N-piperazinylpropylidene)-thiaxanthene or the corresponding N'-2-hydroxyethyl compound is worked up in accord with Examples 19 and 21 and separated either in the form of the free base or an acid addition salt thereof. If desired, the N'-2-hydroxyethyl products may be further reacted with an acylating agent in the manner of Example 5, to produce a corresponding N'-2-lower-aliphatic acyloxy compound, for example, the corresponding N'-2-propionoxyethyl compound or an acid addition salt, e.g., a hydrochloride, thereof.

It is to be understood that the invention is not limited to the exact details of operation or exact compounds shown and described, as obvious modifications and equivalents will be apparent to one skilled in the art, and the invention is therefore to be limited only by the scope of the appended claims.

We claim:

1. Method for the preparation of a compound selected from the class consisting of (1) xanthenes and thiaxanthenes of the formula:

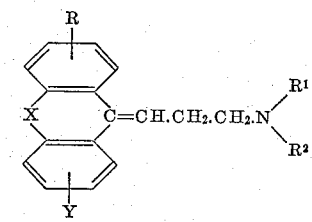

I in which X is selected from the group consisting of oxygen and sulfur, each of R and Y is selected from the group consisting of hydrogen, halogen, lower-alkoxy and lower-alkylmercapto, and

is selected from the group consisting of methylamino, dimethylamino, morpholino, thiamorpholino, pyrrolidino, piperidino, piperazino, N'-lower-alkyl-piperazino, N'-hydroxy-lower - alkylpiperazino, and N'-lower - aliphatic acyloxy-lower-alkylpiperazino, and (2) acid addition salts thereof, which includes the steps of (a) dehydrating a compound of the formula:

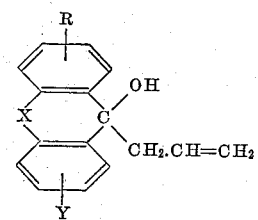

II in which X, R and Y are as given above, with a dehydrating agent as hereinafter defined to effect the splitting out of water and to produce a compound of the formula:

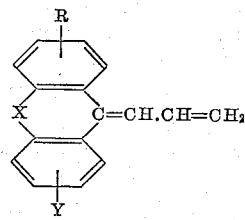

III in which X, R and Y are as given above, and (b) reacting the resulting compound of Formula III with an amine of the formula

wherein

is as given above, to produce a compound of Formula I, and (c) isolating the resulting compound of Formula I in the form of a compound selected from the group consisting of (1) its free base and (2) an acid addition salt thereof, said dehydrating agent being selected from the group consisting of acids and compounds which form acids in the reaction mixture.

2. Method according to claim 1, characterized in that the reaction product of Formula III is reacted with piperazine to produce the corresponding 9-(3'-N-piperazinopropylidene) compound and that an N'-substituent selected from the group consisting of lower-alkyl and hydroxylower-alkyl is subsequently introduced into the piperazine ring by reacting the said resulting 9-(3'-N-piperazinopropylidene) compound with an alkylating agent selected from the group consisting of (1) methanolic formaldehyde in formic acid, (2) reactive esters of the formula Q-lower-alkyl and Q-lower-alkylene-OH, wherein lower-alkyl and lower-alkylene contain up to and including eight carbon atoms and wherein Q is the remainder of the reactive ester, and is selected from the group consisting of a halogen atom, a sulfonic acid radical, and a sulfuric acid radical, and (3) lower-alkylene oxides.

3. Method according to claim 1, characterized in that the dehydrating agent employed for reaction with a compound of Formula II is a strong acid.

4. Method according to claim 1, characterized in that the dehydration is carried out in the presence of acetic anhydride as a water-binding agent.

5. Method according to claim 6, characterized in that the reaction of a compound of Formula III with an amine is carried out in the presence of an excess of the amine.

6. Method for the preparation of a compound selected from the class consisting of (1) xanthenes and thiaxanthenes of the formula:

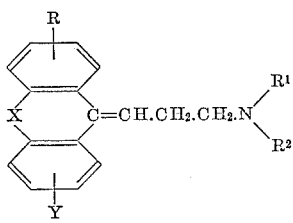

in which X is selected from the group consisting of oxygen and sulfur, each of R and Y is selected from the group consisting of hydrogen, halogen, lower-alkoxy and lower-alkylmercapto, and

is selected from the group consisting of methylamino, dimethylamino, morpholino, thiamorpholino, pyrrolidino, piperidino, piperazino, N'-lower-alkylpiperazino, N'-hydroxy-lower-alkylpiperazino, and N'-lower-aliphatic acyloxy-lower-alkylpiperazino, and (2) acid addition salts thereof, which includes the steps of (a) reacting a compound of the formula:

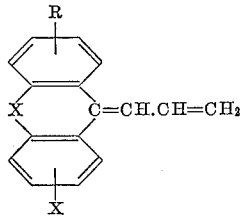

in which X, R and Y are as given above, with an amine of the formula

wherein

is as given above, to produce a compound of Formula I above, and isolating the resulting compound of Formula I in the form of a compound selected from the group consisting of (1) its free base and (2) an acid addition salt thereof.

7. A compound selected from the class consisting of xanthenes and thiaxanthenes of the formula:

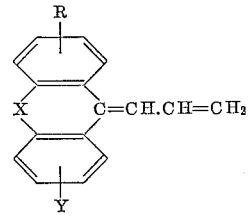

wherein X is selected from the group consisting of oxygen and sulfur, and wherein each of R and Y is selected from the group consisting of hydrogen, halogen, lower-alkoxy and lower-alkylmercapto.

8. 2-chloro-9-(propene-3-ylidene-1)-thiaxanthene.

9. 2-chloro-9-(propene-3-ylidene-1)-xanthene.

10. 2-methoxy-9-(propene-3-ylidene-1)-thiaxanthene.

11. 2-methoxy-9-(propene-3-ylidene-1)-xanthene.

12. A compound selected from the class consisting of (1) xanthenes and thiaxanthenes of the formula

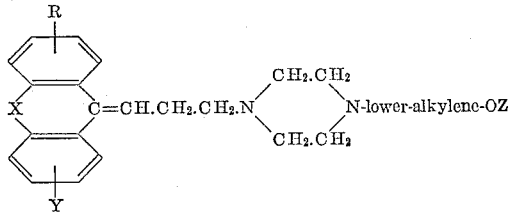

in which X is selected from the group consisting of oxygen and sulfur, each of R and Y is selected from the group consisting of hydrogen, halogen, lower-alkoxy and lower-alkylmercapto, and wherein Z is selected from the group consisting of hydrogen and lower-aliphatic acyl, and (2) pharmacologically acceptable acid addition salts thereof.

13. 2-chloro-9-[3'-(N'-2 - hydroxyethylpiperazino-N)-propylidene]-thiaxanthene.

14. A phamacologically acceptable acid addition salt of 2-chloro-9-[3'-(N'-2-hydroxyethylpiperazino-N)-propylidene]-thiaxanthene.

15. 2-chloro-9-[3'-(N'-2 - hydroxyethylpiperazino-N)-propylidene]-thiaxanthene dihydrochloride.

16. The process of claim 6 wherein the reaction is conducted at a reaction temperature up to about 130 degrees centigrade.

17. The process of claim 16, wherein the amine reactant is dimethylamine.

18. The process of claim 17, wherein the amine reactant is piperazine.

References Cited in the file of this patent

UNITED STATES PATENTS

| | | |
|---|---|---|
| 2,940,969 | Bonvicino et al. | June 14, 1960 |
| 2,947,747 | Craig | Aug. 2, 1960 |
| 2,951,082 | Sprague et al. | Aug. 30, 1960 |
| 2,985,654 | Sherlock et al. | May 23, 1961 |
| 2,996,503 | Sprague et al. | Aug. 15, 1961 |

OTHER REFERENCES

Migdrichian: Organic Synthesis (Textbook), volume 2, pages 880–881; Reinhold Publishing Corp., New York.

Kurihara et al.: Chemical Abstracts, volume 50: page 8636(*b*) (1956), as abstracted from Journal of the Pharmaceutical Society of Japan, volume 75, pages 1267–1269 (1955).

UNITED STATES PATENT OFFICE
CERTIFICATE OF CORRECTION

Patent No. 3,116,291                    December 31, 1963

Povl Viggo Petersen et al.

It is hereby certified that error appears in the above numbered patent requiring correction and that the said Letters Patent should read as corrected below.

Column 1, line 35, for "theerof" read -- thereof --; column 4, line 58, for "pressure" read -- presence --; column 5, line 60, for "ihomer" read -- isomer --; column 7, line 31, for "3'-piperidinylpropylidene" read -- 3'—N—piperidinylpropylidene --; column 9, line 73, for "3'-N'" read -- 3'-(N' --; column 10, line 75, for "64-66" read -- 63-66 --; column 11, line 71, for "milliters" read -- milliliters --; column 15, line 66, for "grame" read -- grams --; column 19, line 9, for "centigrated" read -- centigrade --; column 22, line 68, for "phamacologically" read -- pharmacologically --; column 23, line 3, for the claim reference numeral "17" read -- 16 --.

Signed and sealed this 22nd day of September 1964.

(SEAL)
Attest:

ERNEST W. SWIDER                          EDWARD J. BRENNER
Attesting Officer                     Commissioner of Patents